May 24, 1949.　　　T. ZUSCHLAG　　　2,470,839
MAGNETIC TESTING WITH ARTIFICIAL STANDARD
Filed Feb. 5, 1946
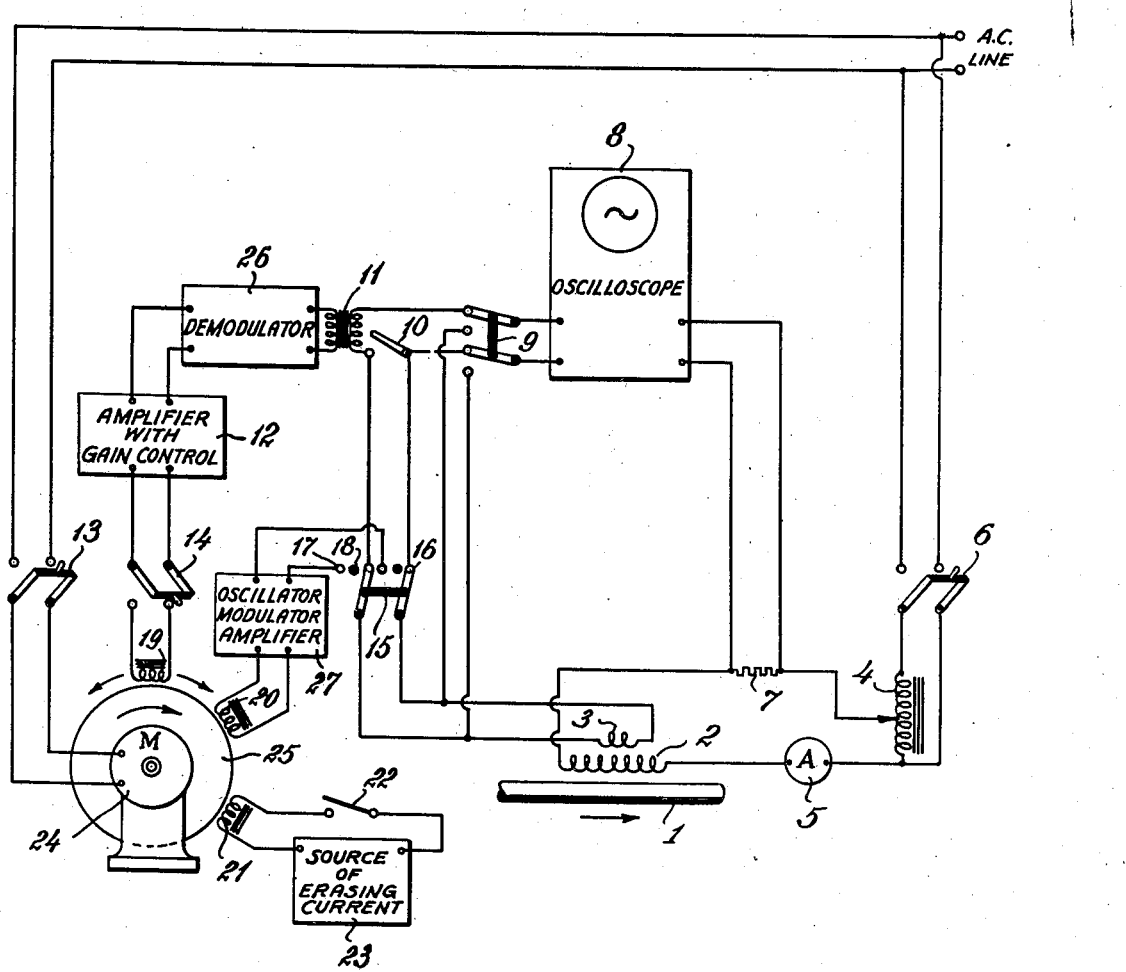
INVENTOR
THEODORE ZUSCHLAG
BY
Pennie, Edmonds, Morton & Barrows.
ATTORNEYS Patented May 24, 1949

2,470,839

UNITED STATES PATENT OFFICE 2,470,839

MAGNETIC TESTING WITH ARTIFICIAL STANDARD

Theodore Zuschlag, West Englewood, N. J., assignor to Magnetic Analysis Corporation, Long Island City, N. Y., a corporation of New York Application February 5, 1946, Serial No. 645,651

10 Claims. (Cl. 175—183)

This invention relates to the testing of magnetic materials, more specifically to the inspection of such materials for uniformity of physical, magnetic or electric characteristics.

Among the many methods heretofore employed in connection with the testing of magnetic materials one of the most effective and generally used has comprised the comparison of a test specimen with a standard of known characteristics. In accordance with that method the standard specimen and the test specimen are subjected to equal energizing fields, and the outputs from pickup coils associated with the two specimens, respectively, are combined and balanced, so that an unbalance as registered by an indicating device, denotes a variation in the test specimen. A more recent improvement on that method has included the use of an oscilloscope upon which may be observed wave-forms, the shapes of which are indicative of the relative characteristics of the two specimens.

According to the present invention the original "standard" specimen is employed only once, viz., while making a record of its characteristics, and thereafter the record, comprising an artificial standard, is repeatedly reproduced for comparison with the test specimen.

Experience in practicing the prior methods above described has made manifest certain inherent disadvantages, among which may be mentioned the following: After a specimen suitable for use as a standard has been selected, this specimen must be used as the standard of comparison for testing all of the material of that run. However, by reason of the nature of the comparison method employed it is necessary that the standard specimen be subjected to exactly the same type and degree of energization as is the unknown specimen. Usually the specimens must be energized by magnetic fields of considerable concentration. Such a field tends to heat the specimen considerably, and such heating alters the magnetic and other characteristics of the standard specimen, even though artificial cooling be employed. This change is sometimes gradual so that it is not recognized until the characteristics of the standard specimen have changed to a considerable degree. Secondly, such standard specimens are bulky, heavy and difficult to store, and furthermore the characteristics thereof sometimes change during storage. From this it will be seen that the "standard" methods heretofore employed have not been dependable.

Another disadvantage in the comparison method as heretofore employed results from the fact that the standard specimen comprising, say, a length of bar stock or tubing, is necessarily held stationary during the testing procedure, whereas the specimen to be tested is moved along its axis in proximity to the coils of the testing apparatus. For this reason the wave-forms resulting from the electric fluctuations picked up from the standard specimen and from the test specimen are not identical when reproduced on an oscilloscope even though the characteristics of the materials themselves are identical. This prohibits a true balance whether it be on a bridge or an oscilloscope. In fact, no entirely successful method has heretofore been proposed for comparison of wave patterns representing the characteristics of a stationary standard specimen and a moving test specimen.

By means of the present invention it is possible to avoid all of the disadvantages heretofore experienced in connection with the methods above mentioned, with the result that it is now possible to employ the comparison method to the best advantage and with considerable increase in accuracy and reliability, while at the same time permitting analysis by observation of wave-form characteristics. To these advantages may be added those of portability and compactness, permanence of the characteristics of the standard, and the ability to repeat the electric fluctuations representing the standard specimen at any desired rate or phase with respect to the fluctuations representative of the test specimen. If the record was made while the standard specimen was moving through the fields of coils 2 and 3 (which is entirely feasible) the resultant waveform as observed on the oscilloscope screen will have the added advantage of truly representing fluctuations produced by similar and simultaneous motion of both specimens.

The improvements resulting from this invention are achieved by recording on a suitable record medium the electric fluctuations representing the characteristics of the standard specimen, and thereafter reproducing the recorded fluctuations and actuating an oscilloscope with such fluctuations in combination with corresponding fluctuations representing the characteristics of the test specimen. If the mentioned recording is made on a short, endless record such as a disc, for example, the record may be rotated so as to repeat the "standard" fluctuations at a rate permitting the combination of the two wave patterns in opposition, which results in a great emphasis on the oscilloscope screen of any difference in the respective fluctuations.

The single figure of the drawing diagrammatically illustrates the improved apparatus for testing the specimen.

A more complete understanding of the invention will be had by consideration of the drawing, in which a specimen 1 may be taken to represent either a "standard" specimen or a test specimen, depending upon which part of the method according to the invention is assumed to be in process. The specimen is energized by a magnetic field generated by energizing coil 2, the energizing current in coil 2 being derived from the A. C. line through line switch 6, and adjustable autotransformer 4. An ammeter 5 in series with coil 2 may be employed in adjusting the energizing current to the desired value. A non-inductive resistor 7 connected in the energizing coil circuit is connected to the oscilloscope 8 for the purpose of synchronizing the horizontal sweep with the vertical deflections in a manner well known in the art.

A pickup coil 3, which preferably is positioned symmetrically with respect to coil 2 and electromagnetically related to the specimen 1, is connected by a switch 15 to either of two circuits. Recording head 20 is connected through apparatus 27 to the left-hand position 17 of switch 15. To the right-hand position 16 of switch 15 is connected the input circuit of the oscilloscope 8. This input circuit includes the secondary of a coupling transformer 11, a shunt switch 10 and the upper contacts of the oscilloscope input switch 9. The lower contacts of switch 9 connect directly to the two terminals of pickup coil 3. The center position 18 of switch 15 is a neutral or unconnected position, in which coil 3 is not connected to transformer 11 or to recording head 20. Thus, when switch 15 is in the center position 18, and oscilloscope switch 9 is in the lower position, pickup coil 3 is directly connected to the input of the oscilloscope, and is disconnected from all other circuit components. In the positions of switches 9, 10 and 15, as shown, fluctuations induced in coil 3 and also fluctuations passing through transformer 11 will be impressed upon the oscilloscope.

In accordance with prior practice an actual physical specimen of the material is employed as a standard of comparison, whereas by the present invention a recording of such characteristics is made for use as an artificial standard. For this purpose the apparatus of the invention includes an endless record 25, preferably circular in form, to permit a repetition of the reproduction from the record at any desired rate. The recording may be by engraving, photo-chemical, electromagnetic or other process. In the drawing, the record 25 may be assumed to comprise a disc of thin magnetic material of homogeneous nature. Alternatively, this disc may comprise any suitable non-magnetic material, such as cardboard, plastic or ceramic, for example, to which a thin coating of magnetic material is applied as by spraying or sputtering. In either case the record is made in known manner by impressing electromagnetic fluctuations induced from a recording head 20 on the magnetic material as it passes beneath the head. When a disc-shaped record medium is used, as in the drawing, the recording is most satisfactorily made at the rim of the disc. Hence, in the case of the coated record, only the rim portion need bear the coating of magnetic material. The older forms of magnetic tape or wire may also be employed as the magnetic record medium, but when employed for the purpose of the present invention it should be made in the form of a short, closed loop to permit repetition of the recording.

The record disc 25, as illustrated in the drawing, is rotated by a motor 24. This motor is preferably driven by current from the A. C. line under the control of motor switch 13. If the motor is of the synchronous type the reproduction by the oscilloscope of the fluctuations derived from the test specimen and from the record as a standard can be readily synchronized. It may be desirable to insert a gear train or other speed changing mechanism between the motor and the record. Usually the record is rotated more slowly than the motor.

The box 27, labeled "Oscillator, modulator, amplifier" represents whatever equipment of the nature indicated is required for the type of recording employed. For example, if the frequency range of the fluctuations induced in pickup coil 3 is within a low-frequency band only, it may be that the apparatus represented in box 27 may be omitted altogether, although it is usually preferable to include at least an audiofrequency amplifier in the circuit with the recording head 20 so that the intensity of the fluctuations may be predetermined and adjusted to be correct for the type of record being made. For certain types of testing or inspection it has been found desirable to modulate a high-frequency carrier with the lower-frequency fluctuations induced in pickup coil 3. It is also for this purpose that the equipment represented in box 27 is shown. To record fluctuations of the modulated high-frequency carrier wave type it is necessary that the equipment in box 27 include a suitable oscillator, a modulator and an amplifier, all of which are well known in the art and require no detailed description. This equipment may be either of the amplitude-modulation or frequency-modulation type, each type having certain advantages in connection with different types of testing or inspection.

In order that the same record medium may be employed for a new or different recording, a suitable source 23 of erasing current is provided, and may be connected to erasing coil 21 by closing switch 22. This erasing current may be direct current, but it is likely to be more satisfactory to employ alternating current of fairly high frequency.

The reproduction of the record 25 is achieved through reproducing head 19 which should be mounted in magnetic relation to the record, so as to permit movement in the direction or against the direction of rotation of the record, as indicated by the arrows extending from coil 19. This movement of the reproducing head provides a timing or phase adjustment of the reproduced fluctuations or signals, as will be explained below in connection with the operation of the apparatus. Closure of switch 14 passes the fluctuations from reproducing head 19 into the input of amplifier 12. This amplifier should include, as indicated, a suitable gain control for manually adjusting the amplitude of the fluctuations supplied to the oscilloscope 8. In the event that the recording is of modulated carrier-wave signals or fluctuations, there should be included a demodulator 26 of suitable type for the specific form of carrier wave recorded, depending upon whether it be amplitude modulated or frequency modulated. If a frequency-modulated carrier is employed, the box 26 should include equipment of the type commonly employed in frequency-modulation receivers for radio reception. The output of amplifier 12 (or of demodulator 26, if employed) is coupled through coupling transformer 11, switch 10 and switch 9 to the input of the oscilloscope. For this purpose switch 9 should be in the upper portion, as illustrated, and switch 10 closed if only the recorded fluctuations are to be indicated.

Operation

Because of the flexibility of the apparatus provided by this invention various testing procedures may be employed. The following description includes my preferred method for testing magnetic material in accordance with the invention.

First, a specimen 1 of the material to be tested for its desired characteristics, such as freedom from flaws and defects. It is then placed in electromagnetic relation to coils 2 and 3 and energized with an alternating field by closing switch 6 and adjusting the current, as indicated on ammeter 5, by means of adjustment of autotransformer 4. Then, with the switches 15, 10 and 9 in the positions shown in the drawing, the oscilloscope is adjusted to give a clear indication of the fluctuations picked up by coil 3 under the conditions mentioned. The record 25 is then caused to rotate by operation of motor 20 and the switch 15 is thrown to the left-hand position 17 so that the fluctuations picked up by coil 3 may be recorded on the record 25 through recording head 20. During this step in the procedure the oscillator, modulator, amplifier unit 27, or any required part thereof, such as the amplifier, may be employed as desired to modify the nature of the recorded fluctuations. During the recording step the fluctuations being recorded may be simultaneously observed on the oscilloscope by throwing switch 9 to the down position. Preferably, during the recording process the standard specimen should be caused to move through the coils 2 and 3 at the same rate that the test specimen will be moved during the subsequent inspection process. The use of a synchronous motor 24 assures the necessary synchronism by maintaining the record speed constant during both recording and reproducing. Because of the fact that this entire recording procedure requires but a very short time to complete it is possible to move the standard specimen during recording. Furthermore, no change in the characteristics of the standard specimen will occur during this short period. The record may be utilized, or stored for later utilization, over a long period with the assurance that such use or storage will not result in any significant change in the recording. Also, such records are small, light, and easy to handle and store. From the foregoing it will be seen that such a record comprises a much more reliable and practicable "standard" than the original standard itself.

After the record has been made, the recording alone may be observed by closing switch 14, moving switch 9 to the upward position and closing switch 10. It is desirable also to move switch 15 to the center position 18. Then, after suitable adjustment of the amplifier 12 and of the demodulator 26, if used, the wave-form representative of the recorded fluctuations may be observed on oscilloscope 8; it being assumed, of course, that the motor 25 is driving the record 25.

A record having already been made of a "standard" specimen as above described, the specimen to be tested is run through the fields of coils 2 and 3, switches 9, 10 and 15 being thrown in the positions shown in the drawing, and switches 6, 14 and 13 being closed. The oscilloscope will now show on its screen, traces corresponding to the fluctuations picked up from the specimen by coil 3 and also the recorded fluctuations picked up by coil 19. Because of the synchronization inherent in this system, the speed of the record 25 will be such that the frequency of the basic wave-form on the oscilloscope due to the recorded fluctuations is the same as the frequency of the fluctuations on the oscilloscope picked up by coil 3. The wave-forms from the two different sources will, in general, be similar, any differences between them being due to differences in characteristics between the original standard specimen and the specimen now under test. Therefore, if these two wave-forms are combined at the oscilloscope in opposing phase, the wave-forms will tend to cancel each other and produce an approximately straight line on the oscilloscope screen. Such phase opposition may be effected either by reversing the polarity of one of the sources of fluctuations with respect to the other or by moving pickup head 19 in the direction of one of the arrows far enough to reverse the phase of the reproduced fluctuations. The adjustment resulting in such reverse phase can readily be ascertained by observing the oscilloscope screen. Thereafter, the gain control of amplifier 12 should be adjusted so as to give minimum amplitude of whatever wave-form remains, viz., to minimize the amplitude of the fluctuations remaining on the oscilloscope screen. Then the phase may be more accurately adjusted to opposition by careful movement of reproducing head 19 in one or the other direction of the arrows in an effort to further minimize the amplitude fluctuations on the oscilloscope screen. The wave-form resulting from the combined fluctuations of the two different sources will, thereafter, remain fixed because the synchronization of the entire system is based upon the fact that it is operated from the same A. C. line source.

After the proper adjustments have been made, a single specimen or a continuous procession of specimens can be caused to pass through the fields of coils 2 and 3 while the screen of oscilloscope 8 is observed. If the characteristics of the specimen under test are exactly similar to those of the artificial standard, a slightly undulating horizontal line will be observed on the oscilloscope. However, as soon as a variation in characteristics (such as a defect) presents itself to the fields of coils 2 and 3, an immediate indication will be observed on the oscilloscope, and the shape of this indication will vary depending upon the nature of the characteristic from which it is derived.

If the record is not needed after testing a given run of metal products, the recording may be erased as above described, and the record medium will then be ready for the making of a new record for the next run.

What is claimed is:

1. The method of magnetic testing which comprises the steps of recording on a record medium a representation of the magnetic characteristics of a standard specimen of material to be tested, electrically reproducing the recorded representation in the form of first electric fluctuations, generating second electric fluctuations representative of the magnetic characteristics of the material under test and actuating an indicating device simultaneously with said first and second electric fluctuations.

2. The method of testing elongated magnetic material which comprises the steps of recording on a record medium a representation of the magnetic characteristics of a standard specimen of material to be tested, electrically reproducing the recorded representation in the form of first electric fluctuations, generating second electric fluctuations representative of the magnetic characteristics of successive portions of the material under test, successively repeating the electrical reproduction of the record at such rate that said first and second fluctuations are in substantial synchronism, combining said fluctuations, and actuating an indicating device with the resultant of said combined fluctuations.

3. The method of testing magnetic material which comprises the steps of recording on a record medium a representation of the magnetic characteristics of a standard specimen of material to be tested, electrically reproducing the recorded representation in the form of first electric fluctuations, generating second electric fluctuations representative of the magnetic characteristics of successive portions of the material under test, successively repeating the electrical reproduction of the record at such rate that said first and second fluctuations are in substantial synchronism, modifying the average amplitude of one of the sets of fluctuations so as to be approximately equal to that of the other set of fluctuations, combining said fluctuations in opposition, and actuating an indicating device with the resultant of said combined fluctuations.

4. The method of testing magnetic material which comprises the steps of recording on a record medium a representation of the magnetic characteristics of a standard specimen of material to be tested, electrically reproducing the recorded representation in the form of first electric fluctuations, generating second electric fluctuations representative of the magnetic characteristics of successive portions of the material under test, successively repeating the electrical reproduction of the record at such rate that said first and second fluctuations are in substantial synchronism, combining said first and second fluctuations in substantially equal and opposite phase, and actuating an indicating device with the resultant of said combined fluctuations.

5. The method of testing magnetic material which comprises the steps of recording on a record medium a representation of the magnetic characteristics of a standard specimen of material to be tested while said specimen is in motion, electrically reproducing the recorded representation in the form of first electric fluctuations, generating second electric fluctuations representative of the magnetic characteristics of a specimen of the material under test while said test specimen is in motion similar to that employed for said standard specimen, successively repeating the electrical reproduction of the record at such rate that said first and second fluctuations are in substantial synchronism, modifying the average amplitude of one of the sets of fluctuations so as to be approximately equal to that of the other set of fluctuations, combining said fluctuations in opposition, and actuating an indicating device with the resultant of said combined fluctuations.

6. The method of testing magnetic material which comprises the steps of recording on a record medium a representation of the magnetic characteristics of a standard specimen of material to be tested while said specimen is in motion, electrically reproducing the recorded representation in the form of first electric fluctuations, generating second electric fluctuations representative of the magnetic characteristics of a specimen of the material under test while said test specimen is in motion similar to that employed for said standard specimen, successively repeating the electrical reproduction of the record at such rate that said first and second fluctuations are in substantial synchronism, combining said first and second fluctuations in substantially equal and opposite phase, and actuating an indicating device with the resultant of said combined fluctuations.

7. In a system for testing magnetic materials, an energizing coil connected to be energized from an alternating current source, a pickup coil positioned symmetrically with respect to said energizing coil, means for placing a specimen of said material within the fields of both coils, a recording device including recording and reproducing means, means for connecting said pickup coil to said recording means, an indicating device, means for connecting said reproducing means to said indicating device, and means for connecting said pickup coil to said indicating device such that fluctuations from said reproducing device and said pickup coil are impressed on said indicating device simultaneously.

8. In a system for testing magnetic materials, an energizing coil connected to be energized from an alternating current source, a pickup coil positioned symmetrically with respect to said energizing coil, means for placing a specimen of said material within the fields of both coils, a recording device including recording and reproducing means, means for connecting said pickup coil to said recording means, an indicating device, means for connecting said reproducing means to said indicating device, means for connecting said pickup coil to said indicating device such that fluctuations from said reproducing device and said pickup coil are impressed on said indicating device simultaneously, and means for adjusting the relative amplitude and phase of the fluctuations impressed on said indicating device.

9. The method of magnetic testing which comprises the steps of recording on a record medium a representation of the magnetic characteristics of a standard specimen of material to be tested, electrically reproducing the recorded representation in the form of first electric fluctuations, generating second electric fluctuations representative of the magnetic characteristics of the material under test, combining said first and second fluctuations and actuating an indicating device with the resultant of said combined fluctuations.

10. The method of magnetic testing which comprises the steps of recording on a record medium a representation of the magnetic characteristics of a standard specimen of material to be tested, electrically reproducing the recorded representation in the form of first electric fluctuations, generating second electric fluctuations representative of the magnetic characteristics of the material under test, combining said first and second fluctuations and impressing said combined fluctuations on an indicating device to form third and visible fluctuations.

THEODORE ZUSCHLAG.

REFERENCES CITED

The following references are of record in the file of this patent:

FOREIGN PATENTS

| Number | Country | Date |
|---|---|---|
| 1,555,800 | Huber | Sept. 29, 1925 |
| 2,010,189 | Hallowell | Aug. 6, 1935 |
| 2,338,991 | Arnold | Jan. 11, 1944 |